(12) United States Patent
Low

(10) Patent No.: US 9,074,115 B2
(45) Date of Patent: Jul. 7, 2015

(54) HEAT TRANSFER COMPOSITIONS

(71) Applicant: Mexichem Amanco Holding S.A. de C.V., Tlalnepantla (MX)

(72) Inventor: Robert E. Low, Cheshire (GB)

(73) Assignee: Mexichem Amanco Holding S.A. de C.V., Tlalnepantla (MX)

( * ) Notice: Subject to any disclaimer, the term of this patent is extended or adjusted under 35 U.S.C. 154(b) by 0 days.

(21) Appl. No.: 14/552,622

(22) Filed: Nov. 25, 2014

(65) Prior Publication Data

US 2015/0075165 A1    Mar. 19, 2015

Related U.S. Application Data

(63) Continuation of application No. 13/393,031, filed as application No. PCT/GB2010/000775 on Apr. 16, 2010, now Pat. No. 8,894,874.

(30) Foreign Application Priority Data

Aug. 28, 2009 (GB) .................................. 0915004.6

(51) Int. Cl.
| | |
|---|---|
| C09K 5/04 | (2006.01) |
| F25B 1/00 | (2006.01) |
| F25B 45/00 | (2006.01) |
| F01K 25/08 | (2006.01) |
| G06Q 30/00 | (2012.01) |

(52) U.S. Cl.
CPC .................. *C09K 5/045* (2013.01); *F25B 1/005* (2013.01); *F25B 45/00* (2013.01); *F01K 25/08* (2013.01); *G06Q 30/018* (2013.01); *C09K 2205/40* (2013.01); *C09K 2205/43* (2013.01); *C09K 2205/22* (2013.01); *C09K 2205/126* (2013.01)

(58) Field of Classification Search
CPC ............. C09K 5/045; C09K 2205/126; C09K 2205/22; F25B 9/006
USPC .......... 252/67, 68, 69, 364; 62/114, 467, 468; 521/121; 60/531; 134/36
See application file for complete search history.

(56) References Cited

U.S. PATENT DOCUMENTS

| | | | |
|---|---|---|---|
| 3,723,318 A | 3/1973 | Butler | |
| 3,884,828 A | 5/1975 | Butler | |
| 8,070,977 B2 | 12/2011 | Rached | |
| 8,808,569 B2 * | 8/2014 | Rached | ........................... 252/67 |
| 8,816,341 B2 * | 8/2014 | Kim et al. | ........................ 257/40 |
| 8,894,874 B2 * | 11/2014 | Low | ................................ 252/67 |
| 2005/0245421 A1 | 11/2005 | Singh et al. | |
| 2006/0243944 A1 | 11/2006 | Minor et al. | |
| 2006/0243945 A1 | 11/2006 | Minor et al. | |
| 2008/0230738 A1 * | 9/2008 | Minor et al. | ...................... 252/67 |
| 2008/0314073 A1 | 12/2008 | Minor | |
| 2009/0120619 A1 * | 5/2009 | Sievert et al. | ............. 165/104.27 |
| 2011/0258147 A1 | 10/2011 | Low | |
| 2012/0049104 A1 | 3/2012 | Rached | |
| 2012/0097885 A9 | 4/2012 | Hulse et al. | |
| 2012/0126187 A1 | 5/2012 | Low | |
| 2012/0153213 A1 | 6/2012 | Rached | |
| 2012/0159982 A1 | 6/2012 | Rached | |
| 2012/0298909 A1 * | 11/2012 | Low | ................................ 252/68 |
| 2013/0145778 A1 | 6/2013 | Yana Motto et al. | |

FOREIGN PATENT DOCUMENTS

| | | |
|---|---|---|
| EP | 2149592 | 2/2010 |
| JP | 4110388 | 4/1992 |
| JP | 2003-076747 | 3/2003 |
| RU | 2073058 | 2/1997 |
| WO | WO2008/027555 | 3/2008 |
| WO | WO2009/047542 | 4/2009 |
| WO | WO2010/000993 | 1/2010 |
| WO | WO2010/002020 | 1/2010 |
| WO | WO2010/002023 | 1/2010 |
| WO | WO2010/059677 | 5/2010 |
| WO | WO2010/064005 | 6/2010 |

OTHER PUBLICATIONS

ASHRAE standard 34 (2004)—Appendix P.
ASHRAE standard 34 (2007)—Appendix B.
ASTM E681-04, "Standard test method for concentration Limits of Flammability of Chemicals (vapours and gases)." Jun. 14, 2012.
ASTM E681-04, Annex 1, Jun. 14, 2012.
http://en.wikipedia.org/wiki/Total_equivalent_warming_impact (as downloaded 16:22 GMT May 18, 2012).
Papasavva and Hill (2007), SAE 8th Alternate Refrigerant Systems Symposium.
Reid et al., (1986), The Properties of Gases and Liquids, 4th edition.
NIST Reference Fluid Thermodynamic and Transport Properties, www.nist.gov/srd/PDFfiles/REFROP8.PDF, Apr. 2007.

* cited by examiner

*Primary Examiner* — Douglas McGinty

(74) *Attorney, Agent, or Firm* — Ryan Kromholz & Manion, S.C.

(57) ABSTRACT

The invention provides a heat transfer composition comprising (i) from about 45 to about 75% by weight 2,3,3,3-tetrafluoropropene (R-1234yf); and (ii) from about 25 to about 55% by weight 1,1,1,2-tetrafluoroethane (R-134a). A heat transfer composition comprising, optionally consisting essentially of, (i) from about 20 to about 90% by weight R-1234yf; (ii) from about 10 to about 60% by weight R-134a; and (iii) from about 1 to about 20% by weight R-32 is also provided.

40 Claims, 7 Drawing Sheets

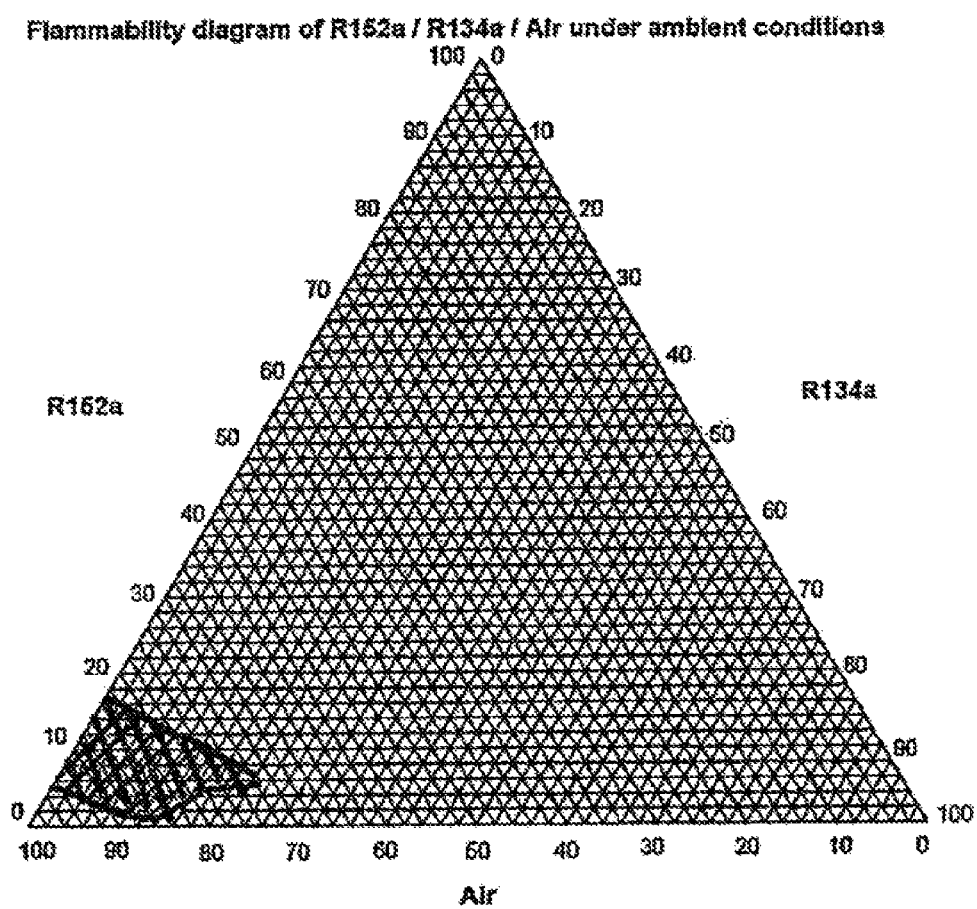
Figure 1: Flammability diagram for R-152a/R-134a/air at 23°C

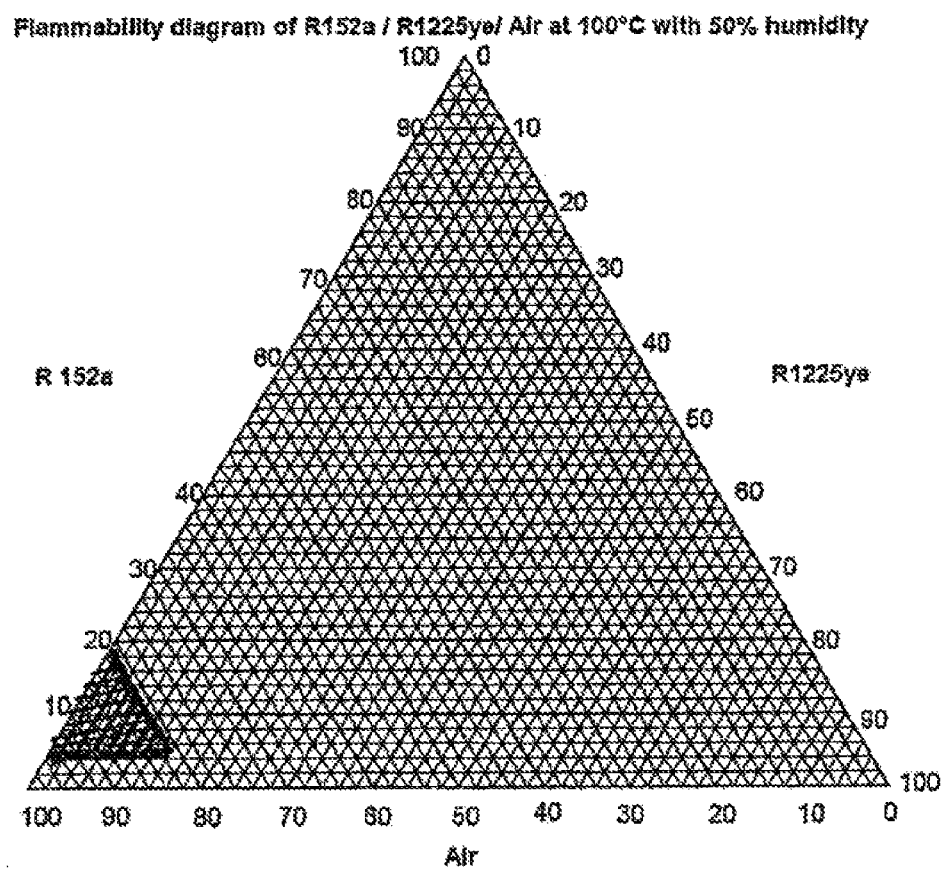
Figure 2: Flammability diagram for R-152a/R-1225ye(Z)/air at 100°C

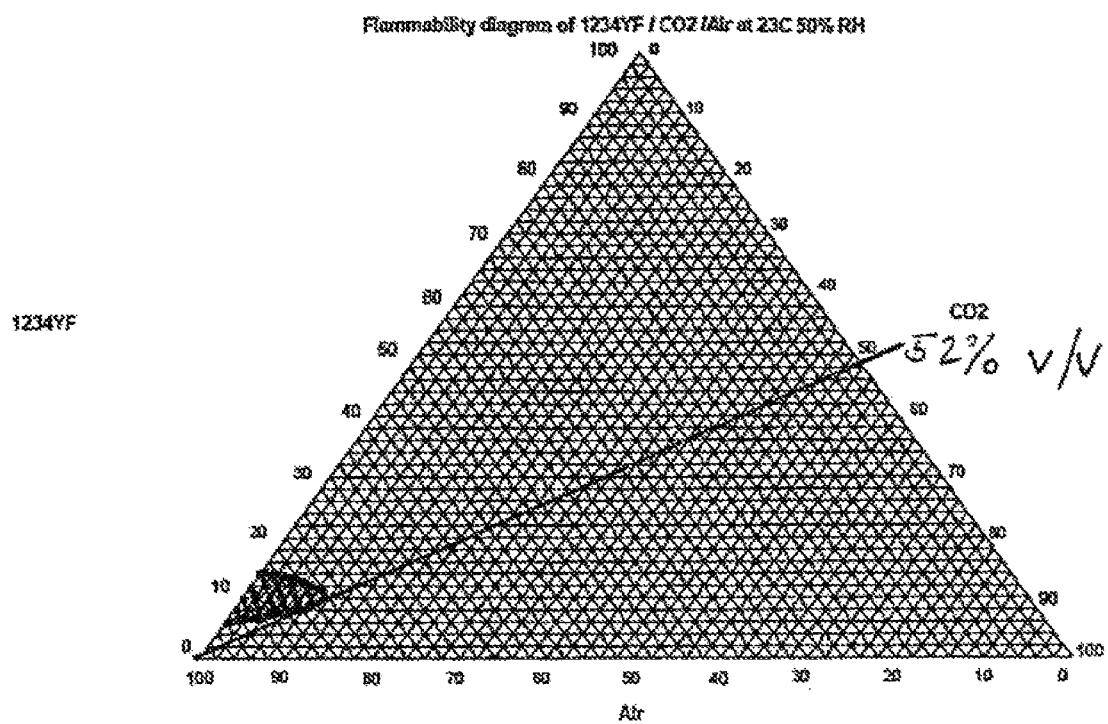
Figure 3: Flammability of R-1234yf/CO2/air mixtures at 23°C

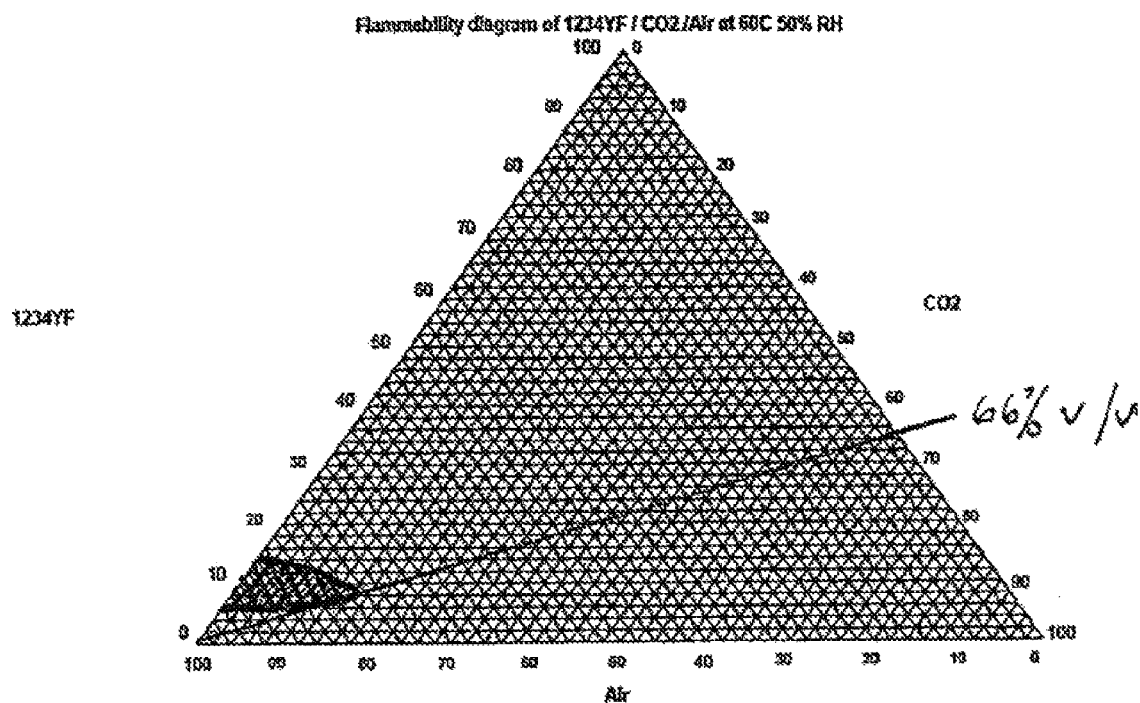
Figure 4: Flammability of R-1234yf/CO2/air mixtures at 60°C

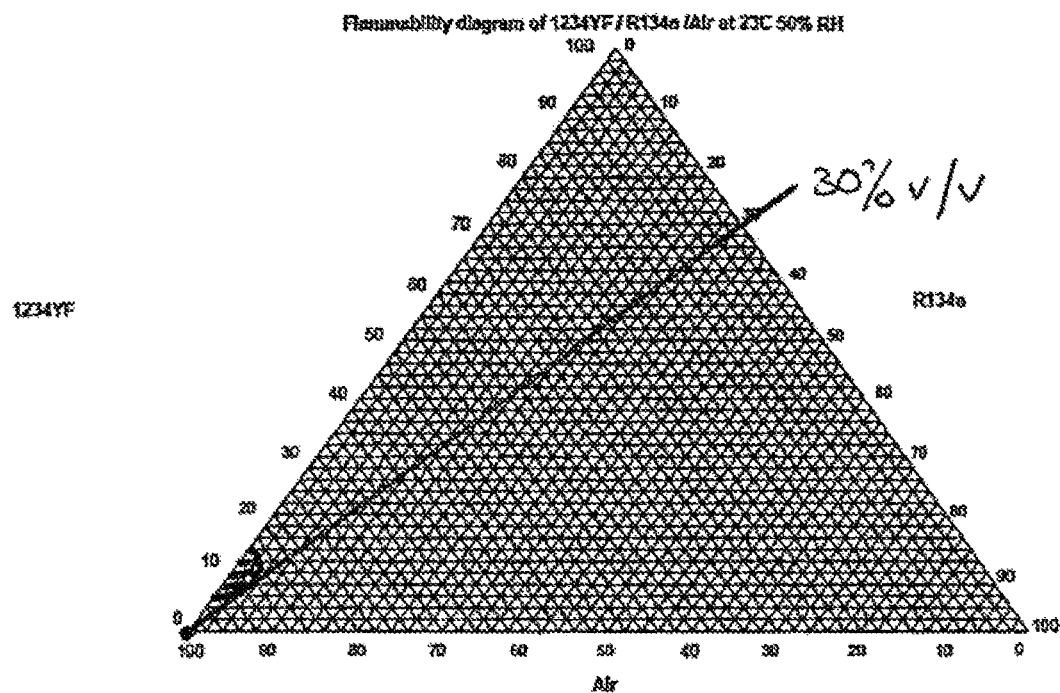
Figure 5: Flammability of R-1234yf/R-134a/air mixtures at 23°C

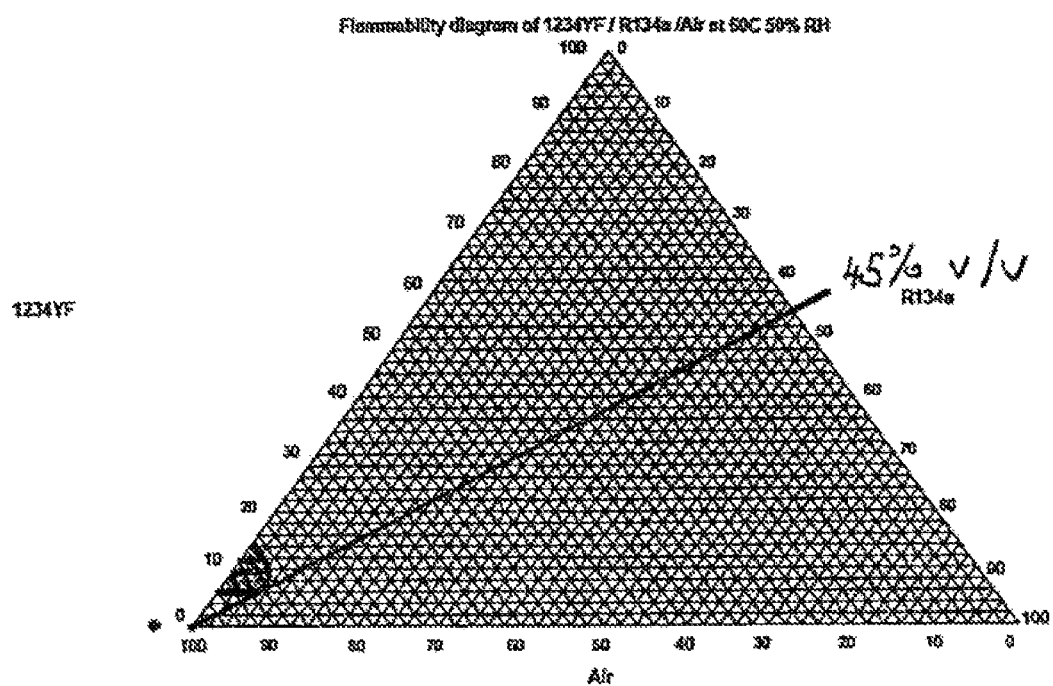
Figure 6: Flammability of R-1234yf/R-134a/air mixtures at 60°C

Figure 7: Flammability diagram of a R32/R-1234yf fuel (12:88 v/v) with R-134a at 60°C
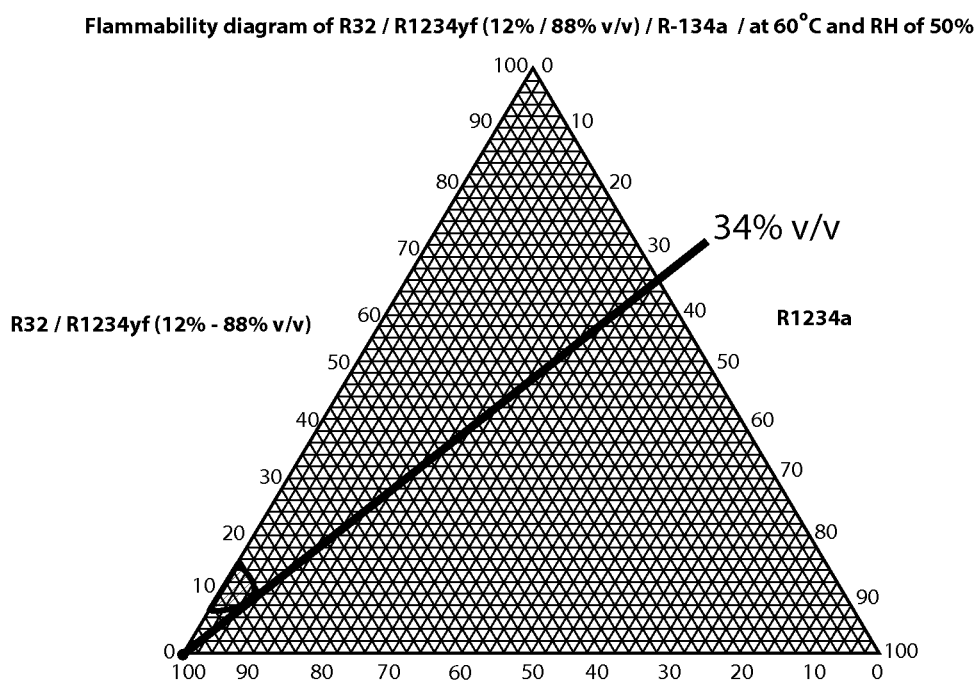

HEAT TRANSFER COMPOSITIONS

RELATED APPLICATIONS

The present application is a continuation of U.S. patent application Ser. No. 13/393,031, filed on Jul. 12, 2012, now U.S. Pat. No. 8,894,874, issued on Nov. 25, 2014 which is the national phase entry under 35 U.S.C. 5 371 of International Application No. PCT/GB2010/000775, filed Apr. 16, 2010, which claims priority to Great Britain Patent Application No. 0915004.6, filed on Aug. 28, 2009.

BACKGROUND OF THE INVENTION

The invention relates to heat transfer compositions, and in particular to heat transfer compositions which may be suitable as replacements for, or alternatives to, existing refrigerants such as R-134a, R-152a, R-1234yf, R-22, R-410A, R-407A, R-407B, R-407C, R-507 and R-404A. Certain of the compositions are particularly suitable as alternatives for replacing R-134a.

Mechanical refrigeration systems and related heat transfer devices such as heat pumps and air-conditioning systems are well known. In such systems, a refrigerant liquid evaporates at low pressure taking heat from the surrounding zone. The resulting vapour is then compressed and passed to a condenser where it condenses and gives off heat to a second zone, the condensate being returned through an expansion valve to the evaporator, so completing the cycle. Mechanical energy required for compressing the vapour and pumping the liquid is provided by, for example, an electric motor or an internal combustion engine.

In addition to having a suitable boiling point and a high latent heat of vaporisation, the properties preferred in a refrigerant include low toxicity, non-flammability, non-corrosivity, high stability and freedom from objectionable odour. Other desirable properties are ready compressibility at pressures below 25 bars, low discharge temperature on compression, high refrigeration capacity, high efficiency (high coefficient of performance) and an evaporator pressure in excess of 1 bar at the desired evaporation temperature.

Dichlorodifluoromethane (refrigerant R-12) possesses a suitable combination of properties and was for many years the most widely used refrigerant. Due to international concern that fully and partially halogenated chlorofluorocarbons, such as dichlorodifluoromethane and chlorodifluoromethane, were damaging the earth's protective ozone layer, there was general agreement that their manufacture and use should be severely restricted and eventually phased out completely. The use of dichlorodifluoromethane was phased out in the 1990's.

Chlorodifluoromethane (R-22) was introduced as a replacement for R-12 because of its lower ozone depletion potential. Following concerns that R-22 is a potent greenhouse gas, its use is also being phased out. R-410A and R-407 (including R-407A, R-407B and R-407C) have been introduced as a replacement refrigerant for R-22. However, R-22, R-410A and the R-407 refrigerants all have a high global warming potential (GWP, also known as greenhouse warming potential).

1,1,1,2-tetrafluoroethane (refrigerant R-134a) was introduced as a replacement refrigerant for R-12. However, despite having a low ozone depletion potential, R-134a has a GWP of 1430. It would be desirable to find replacements for R-134a that have a lower GWP.

R-152a (1,1-difluoroethane) has been identified as an alternative to R-134a. It is somewhat more efficient than R-134a and has a greenhouse warming potential of 120. However the flammability of R-152a is judged too high, for example to permit its safe use in mobile air conditioning systems. In particular its lower flammable limit in air is too low, its flame speeds are too high, and its ignition energy is too low.

R-1234yf (2,3,3,3-tetrafluoropropene) has been identified as a candidate alternative refrigerant to replace R-134a in certain applications, notably the mobile air conditioning or heat pumping applications. Its GWP is about 4. R-1234yf is flammable but its flammability characteristics are generally regarded as acceptable for some applications including mobile air conditioning or heat pumping. In particular its lower flammable limit, ignition energy and flame speed are all significantly lower than that of R-152a. However the energy efficiency and refrigeration capacity of R-1234yf have been found to be significantly lower than those of R-134a and in addition the fluid has been found to exhibit increased pressure drop in system piping and heat exchangers. A consequence of this is that to use R-1234yf and achieve energy efficiency and cooling performance equivalent to R-134a, increased complexity of equipment and increased size of pipe is required, leading to an increase in indirect emissions associated with equipment. Furthermore, the production of R-1234yf is thought to be more complex and less efficient in its use of energy and fluorinated and chlorinated raw materials than R-134a. So the adoption of R-1234yf to replace R-134a will consume more raw materials and result in more indirect emissions of greenhouse gases than does R-134a. Moreover, R-1234yf is known to be only poorly miscible with several standard polyalkylene glycol (PAG) lubricants used with R-134a, such as Nippon Denson ND8.

Whilst heat transfer devices of the type to which the present invention relates are essentially closed systems, loss of refrigerant to the atmosphere can occur due to leakage during operation of the equipment or during maintenance procedures. It is important, therefore, to replace fully and partially halogenated chlorofluorocarbon refrigerants by materials having zero ozone depletion potentials.

In addition to the possibility of ozone depletion, it has been suggested that significant concentrations of halocarbon refrigerants in the atmosphere might contribute to global warming (the so-called greenhouse effect). It is desirable, therefore, to use refrigerants having relatively short atmospheric lifetimes as a result of their ability to react with other atmospheric constituents such as hydroxyl radicals or as a result of ready degradation through photolytic processes.

The environmental impact of operating an air conditioning or refrigeration system, in terms of the emissions of greenhouse gases, should be considered with reference not only to the direct GWP of the refrigerant, but also with reference to the indirect emissions, meaning those emissions of carbon dioxide resulting from consumption of electricity or fuel to operate the system. Several metrics of this total GWP impact have been developed, including those known as Total Equivalent Warming Impact (TEWI) analysis, or Life-Cycle Carbon Production (LCCP) analysis. Both of these measures include estimation of the effect of refrigerant GWP and energy efficiency on overall warming impact.

There is a need to provide alternative refrigerants having improved properties, such as low flammability. Fluorocarbon combustion chemistry is complex and unpredictable. It is not always the case that mixing a non-flammable fluorocarbon with a flammable fluorocarbon reduces the flammability of the fluid. For example, the inventors have found that if non-flammable R-134a is mixed with flammable R-152a, the composition can be flammable even if the amount of R152a is less than the lower flammable limit of pure R-152a (See FIG. 1). By contrast, the effect of mixing R-152a with another nonflammable fluorocarbon (R-1225ye(Z)) in a similar test is shown in FIG. 2. It is clear from this study that R-134a can contribute to flame chemistry of other fluorocarbons and cannot therefore be considered simply as an inert flame suppression agent. The situation is rendered even more complex and less predictable if ternary or quaternary compositions are considered.

There is also a need to provide alternative refrigerants that may be used in existing devices such as refrigeration devices with little or no modification.

SUMMARY OF THE INVENTION

A principal object of the present invention, therefore, is to provide a heat transfer composition which is usable in its own right or suitable as a replacement for existing refrigeration usages which should have a reduced GWP, yet have a capacity and energy efficiency (which may be conveniently expressed as the "Coefficient of Performance") ideally within 200 of the values, for example of those attained using existing refrigerants (e.g. R-134a, R-1234yf, R-152a, R-22, R-410A, R-407A, R-407B, R-407C, R-507 and R-404a, particularly R-134a), and preferably within 100 or less (e.g. about 5%) of these values. It is known in the art that differences of this order between fluids are usually resolvable by redesign of equipment and system operational features without entailing significant cost differences. The composition should also ideally have reduced toxicity, acceptable flammability and/or improved miscibility with lubricants, compared to existing refrigerants.

The invention addresses the foregoing and other deficiencies by the provision of a heat transfer composition comprising:

(i) from about 45 to about 75% by weight 2,3,3,3-tetrafluoropropene (R-1234yf); and
(ii) from about 25 to about 55% by weight 1,1,1,2-tetrafluoroethane (R-134a).

The (fluoro) chemicals described herein are commercially available, for example from Apollo Scientific (UK).

Unless otherwise stated, these compositions will be referred to hereinafter as (binary) compositions of the invention.

BRIEF DESCRIPTION OF THE DRAWINGS

FIG. 1 is a Flammability diagram for R-152a/R-134a/air at 23° C.

FIG. 2 is a Flammability diagram for R-152a/R-1225ye (Z)/air at 100° C.

FIG. 3 is a Flammability diagram of R-1234yf/CO$_2$/air at 23° C.

FIG. 4 is a Flammability diagram of R-1234yf/CO$_2$/air at 60° C.

FIG. 5 is a Flammability diagram of R-1234yf/R-134a/air at 23° C.

FIG. 6 is a Flammability diagram of R-1234yf/R-134a/air at 60° C.

FIG. 7 is a Flammability diagram of R-32/R-1234yf fuel (12/88 v/v) with R-134a at 60° C.

DESCRIPTION OF THE PREFERRED EMBODIMENT

An advantageous composition of the invention comprises from about 45 to about 65% R-1234yf by weight; and/or from about 35 to about 55% by weight of R-134a.

A preferred composition of the invention comprises from about 45 to about 60% R-1234yf by weight; and/or from about 40 to about 55% by weight of R-134a.

One aspect of the invention is a composition comprising from about 50 to about 55% R-1234yf by weight; and/or from about 45 to about 50% by weight of R-134a. A related aspect of the invention is a composition comprising from about 50 to about 56% R-1234yf by weight; and/or from about 44 to about 50% by weight of R-134a.

An advantageous composition of the invention comprises from about 54 to about 58% R-1234yf by weight; and/or from about 42 to about 46% by weight of R-134a. A related aspect of the invention is a composition comprising from about 54 to about 56% R-1234yf by weight; and/or from about 44 to about 46% by weight of R-134a.

The compositions of the invention set out above containing R-1234yf and R-134a may contain additional components, such as R-32. Such ternary compositions are described in more detail later in this specification. In one aspect, however, the compositions of the invention consist essentially of (or consist of) the amounts of R-1234yf and R-134a defined above.

Preferred binary compositions consist essentially of (or consist of) about the following amounts of R-1234yf and R-134a in % by weight:

| | % by weight | | | | | | | | | | |
|---|---|---|---|---|---|---|---|---|---|---|---|
| R-1234yf | 45 | 46 | 47 | 48 | 49 | *50* | *51* | 52 | *53* | *54* | *55* |
| R-134a | 55 | 54 | 53 | 52 | 51 | *50* | *49* | 48 | *47* | *46* | *45* |
| R-1234yf | *56* | *57* | *58* | 59 | 60 | 61 | 62 | 63 | 64 | 65 | 66 |
| R-134a | *44* | *43* | *42* | 41 | 40 | 39 | 38 | 37 | 36 | 35 | 34 |
| R-1234yf | 67 | 68 | 69 | 70 | 71 | 72 | 73 | 74 | 75 | | |
| R-134a | 33 | 32 | 31 | 30 | 29 | 28 | 27 | 26 | 25 | | |

The binary compositions shown in italics in the above table are a further preferred set of compositions of the invention. These compositions are believed to be non-flammable at 60° C., as determined by the ASHRAE 34 methodology described in more detail later hereinafter. The binary compositions shown in bold and italics above are another preferred set of compositions of the invention.

The invention also provides a heat transfer composition consisting essentially of R-1234yf, R-134a and difluoromethane (R-32).

The invention further provides a heat transfer composition comprising (or optionally consisting essentially of, or consisting of) (i) from about 20 to about 90% by weight R-1234yf; (ii) from about 10 to about 60% by weight R-134a; and (iii) from about 1 to about 20% by weight R-32.

These are referred to herein as (ternary) compositions of the invention.

In a preferred aspect, the composition comprises (or optionally consists essentially of, or consists of) (i) from about 30 to about 85% by weight R-1234yf; and/or (ii) from about 15 to about 55% by weight R-134a; and/or (iii) from about 1 to about 15% by weight R-32.

In an advantageous embodiment, the composition comprises (or optionally consists essentially of, or consists of) (i) from about 40 to about 80% by weight R-1234yf; and/or (ii) from about 20 to about 50% by weight R-134a; and/or (iii) from about 1 to about 10% by weight R-32.

In a preferred embodiment, the composition comprises (or optionally consists essentially of, or consists of) (i) from about 50 to about 75% by weight R-1234yf; and/or (ii) from about 25 to about 45% by weight R-134a; and/or (iii) from about 1 to about 10% by weight R-32.

In an advantageous aspect, the composition comprises (or optionally consists essentially of, or consists of) (i) from about 55 to about 70% by weight R-1234yf; and/or (ii) from about 25 to about 40% by weight R-134a; and/or (iii) from about 2 to about 10% by weight R-32.

In a preferred aspect, the composition comprises (or optionally consists essentially of, or consists of) (i) from about 55 to about 65% by weight R-1234yf; and/or (ii) from about 30 to about 40% by weight R-134a; and/or (iii) from about 2 to about 8% by weight R-32.

A group of preferred ternary blends of R-1234yf, R-134a and R-32 are set out in the following table.

| | % by weight | | | | | | | | | | |
|---|---|---|---|---|---|---|---|---|---|---|---|
| R-1234yf | 59 | 60 | 61 | 62 | 63 | 64 | 65 | 66 | 67 | 68 | 69 |
| R-134a | 39 | 38 | 37 | 36 | 35 | 34 | 33 | 32 | 31 | 30 | 29 |
| R-32 | 2 | 2 | 2 | 2 | 2 | 2 | 2 | 2 | 2 | 2 | 2 |
| R-1234yf | *58* | *59* | *60* | *61* | *62* | *63* | 64 | 65 | 66 | 67 | 68 |
| R-134a | *38* | *37* | *36* | *35* | *34* | *33* | 32 | 31 | 30 | 29 | 28 |
| R-32 | *4* | *4* | *4* | *4* | *4* | *4* | 4 | 4 | 4 | 4 | 4 |
| R-1234yf | 57 | 58 | 59 | 60 | 61 | 62 | 63 | 64 | 65 | 66 | 67 |
| R-134a | 37 | 36 | 35 | 34 | 33 | 32 | 31 | 30 | 29 | 28 | 27 |
| R-32 | 6 | 6 | 6 | 6 | 6 | 6 | 6 | 6 | 6 | 6 | 6 |
| R-1234yf | 56 | 57 | 58 | 59 | 60 | 61 | 62 | 63 | 64 | 65 | 66 |
| R-134a | 36 | 35 | 34 | 33 | 32 | 31 | 30 | 29 | 28 | 27 | 26 |
| R-32 | 8 | 8 | 8 | 8 | 8 | 8 | 8 | 8 | 8 | 8 | 8 |
| R-1234yf | 55 | 56 | 57 | 58 | 59 | 60 | 61 | 62 | 63 | 64 | 65 |
| R-134a | 35 | 34 | 33 | 32 | 31 | 30 | 29 | 28 | 27 | 26 | 25 |
| R-32 | 10 | 10 | 10 | 10 | 10 | 10 | 10 | 10 | 10 | 10 | 10 |

The ternary compositions shown in italics above are a further preferred set of compositions of the invention. The ternary compositions shown in bold and italics above are another preferred set of compositions of the invention. These compositions are believed to be non-flammable, as determined by the ASHRAE 34 methodology described in more detail later hereinafter.

This specification describes many embodiments falling within the scope of the compositions of the invention defined above. For example, preferred amounts for compounds which make up the compositions of the invention are described in detail, as well as advantageous properties of the compositions of the invention and their proposed utility. It is to be understood that such features of the invention may be combined in any way, as appropriate, as would be understood by the person of ordinary skill in the art.

The inventors have surprisingly found that the compositions of the invention have an advantageous combination of (a) low flammability (compared to R-1234yf alone) or non-flammability, (b) low GWP (compared to R-134a alone), (c) comparable or even improved heat transfer performance (e.g. refrigeration capacity or air-conditioning performance) compared to R-134a, (d) improved heat transfer performance (e.g. refrigeration capacity or air-conditioning performance) compared to R-1234yf, and/or (e) improved compatibility with lubricants (compared to R-1234yf alone).

The skilled person, based on the disclosure in this specification, would be able to select the appropriate amounts of R-1234yf, R-134a (and R-32) to produce a composition of the invention having a desired combination of flammability, GWP, refrigeration performance etc.

The compositions of the invention have zero ozone depletion potential.

Surprisingly, it has been found that the compositions of the invention deliver acceptable properties for use as alternatives to existing refrigerants such as R-134a, R-152a, R-1234yf, R-22, R-410A, R-407A, R-407B, R-407C, R-507 and R-404a, particularly R-134a, while reducing GWP and without resulting in high flammability hazard.

Unless otherwise stated, as used herein "low temperature refrigeration" means refrigeration having an evaporation temperature of from about −40 to about −80° C. "Medium temperature refrigeration" means refrigeration having an evaporation temperature of from about −15 to about −40° C.

Unless otherwise stated, IPCC (Intergovernmental Panel on Climate Change) AR4 (Fourth Assessment Report) values of GWP have been used herein. On this basis, the GWP of R-1234yf, R-32 and R-134a are 4, 675 and 1430, respectively.

In an embodiment, the compositions of the invention have a GWP less than R-134a, R-22, R-410A, R-407A, R-407B, R-407C, R-507 or R-404a, particularly R-134a. Conveniently, the GWP of the compositions of the invention is less than about 3500, 3000, 2500 or 2000. For instance, the GWP may be less than 2500, 2400, 2300, 2200, 2100, 2000, 1900, 1800, 1700, 1600 or 1500. The GWP of the compositions of the invention preferably is less than 1400, 1300, 1200, 1100, 1000, 900, 800, 700, 600 or 500.

Preferably the compositions are of reduced flammability hazard when compared to the individual flammable components of the compositions (e.g. R-1234yf). In one aspect, the compositions have one or more of (a) a higher lower flammable limit (LFL); (b) a higher ignition energy; or (c) a lower flame velocity compared to R-1234yf alone. In a preferred embodiment, the compositions of the invention are non-flammable.

Flammability may be determined in accordance with ASHRAE Standard 34 incorporating the ASTM Standard E-681 with test methodology as per Addendum 34p dated 2004, the entire content of which is incorporated herein by reference.

In some applications it may not be necessary for the formulation to be classed as non-flammable by the ASHRAE 34 methodology; it is possible to develop fluids whose flammability limits will be sufficiently reduced in air to render them safe for use in the application, for example if it is physically not possible to make a flammable mixture by leaking the refrigeration equipment charge into the surrounds. We have found that the effect of adding R-134a, and optionally R-32, to refrigerant R-1234yf is to modify the flammability in mixtures with air in this manner.

Temperature glide, which can be thought of as the difference between bubble point and dew point temperatures of a zeotropic (non-azeotropic) mixture at constant pressure, is a characteristic of a refrigerant; if it is desired to replace a fluid with a mixture then it is often preferable to have similar or reduced glide in the alternative fluid. In an embodiment, the compositions of the invention are zeotropic.

Conveniently, the temperature glide (in the evaporator) of the compositions of the invention is less than about 15K, for example less than about 10K or 5K.

Advantageously, the volumetric refrigeration capacity of the compositions of the invention is within about 150 of the existing refrigerant fluid it is replacing (such as R-134a), preferably within about 100 or even about 50.

In one embodiment, the cycle efficiency (Coefficient of Performance) of the compositions of the invention is within about 100 of the existing refrigerant fluid it is replacing (such as R-134a), preferably within about 50 or even better than the existing refrigerant fluid it is replacing.

Conveniently, the compressor discharge temperature of the compositions of the invention is within about 15K of the existing refrigerant fluid it is replacing (such as R-134a), preferably about 10K or even about 5K.

As used herein, all % amounts mentioned in compositions herein, including in the claims, are by weight based on the total weight of the compositions, unless otherwise stated. By the term "about" used in relation to stated values (such as percentages), we mean ±50, 40, 30, 20, 10, 5, 4, 3, 2 or 1% of the stated value.

The heat transfer compositions of the invention are suitable for use in existing designs of equipment, and are compatible with all classes of lubricant currently used with established HFC refrigerants. They may be optionally stabilized or compatibilized with mineral oils by the use of appropriate additives.

Preferably, when used in heat transfer equipment, the composition of the invention is combined with a lubricant.

Conveniently, the lubricant is selected from the group consisting of mineral oil, silicone oil, polyalkyl benzenes (PABs), polyol esters (POEs), polyalkylene glycols (PAGs), polyalkylene glycol esters (PAG esters), polyvinyl ethers (PVEs), poly (alpha-olefins) and combinations thereof.

An advantage of the (non-flammable) compositions of the invention is that they exhibit improved miscibility with PAG lubricants compared to R-1234yf.

Advantageously, the lubricant further comprises a stabiliser.

Preferably, the stabiliser is selected from the group consisting of diene-based compounds, phosphates, phenol compounds and epoxides, and mixtures thereof.

Conveniently, the refrigerant composition further comprises an additional flame retardant.

Advantageously, the additional flame retardant is selected from the group consisting of tri-(2-chloroethyl)-phosphate, (chloropropyl) phosphate, tri-(2,3-dibromopropyl)-phosphate, tri-(1,3-dichloropropyl)-phosphate, diammonium phosphate, various halogenated aromatic compounds, antimony oxide, aluminium trihydrate, polyvinyl chloride, a fluorinated iodocarbon, a fluorinated bromocarbon, trifluoro iodomethane, perfluoroalkyl amines, bromo-fluoroalkyl amines and mixtures thereof.

Preferably, the heat transfer composition is a refrigerant composition.

Preferably, the heat transfer device is a refrigeration device.

Conveniently, the heat transfer device is selected from group consisting of automotive air conditioning systems, residential air conditioning systems, commercial air conditioning systems, residential refrigerator systems, residential freezer systems, commercial refrigerator systems, commercial freezer systems, chiller air conditioning systems, chiller refrigeration systems, and commercial or residential heat pump systems. Preferably, the heat transfer device is a refrigeration device or an air-conditioning system.

Advantageously, the heat transfer device contains a centrifugal-type compressor.

The invention also provides the use of a composition of the invention in a heat transfer device as herein described.

According to a further aspect of the invention, there is provided a blowing agent comprising a composition of the invention.

According to another aspect of the invention, there is provided a foamable composition comprising one or more components capable of forming foam and a composition of the invention.

Preferably, the one or more components capable of forming foam are selected from polyurethanes, thermoplastic polymers and resins, such as polystyrene, and epoxy resins.

According to a further aspect of the invention, there is provided a foam obtainable from the foamable composition of the invention.

Preferably the foam comprises a composition of the invention.

According to another aspect of the invention, there is provided a sprayable composition comprising a material to be sprayed and a propellant comprising a composition of the invention.

According to a further aspect of the invention, there is provided a method for cooling an article which comprises condensing a composition of the invention and thereafter evaporating said composition in the vicinity of the article to be cooled.

According to another aspect of the invention, there is provided a method for heating an article which comprises condensing a composition of the invention in the vicinity of the article to be heated and thereafter evaporating said composition.

According to a further aspect of the invention, there is provided a method for extracting a substance from biomass comprising contacting the biomass with a solvent comprising a composition of the invention, and separating the substance from the solvent.

According to another aspect of the invention, there is provided a method of cleaning an article comprising contacting the article with a solvent comprising a composition of the invention.

According to a further aspect of the invention, there is provided a method for extracting a material from an aqueous solution comprising contacting the aqueous solution with a solvent comprising a composition of the invention, and separating the substance from the solvent.

According to another aspect of the invention, there is provided a method for extracting a material from a particulate solid matrix comprising contacting the particulate solid matrix with a solvent comprising a composition of the invention, and separating the substance from the solvent.

According to a further aspect of the invention, there is provided a mechanical power generation device containing a composition of the invention.

Preferably, the mechanical power generation device is adapted to use a Rankine Cycle or modification thereof to generate work from heat.

According to another aspect of the invention, there is provided a method of retrofitting a heat transfer device comprising the step of removing an existing heat transfer fluid, and introducing a composition of the invention. Preferably, the heat transfer device is a refrigeration device or (a static) air conditioning system. Advantageously, the method further comprises the step of obtaining an allocation of greenhouse gas (e.g. carbon dioxide) emission credit.

In accordance with the retrofitting method described above, an existing heat transfer fluid can be fully removed from the heat transfer device before introducing a composition of the invention. An existing heat transfer fluid can also be partially removed from a heat transfer device, followed by introducing a composition of the invention.

In another embodiment wherein the existing heat transfer fluid is R-134a, R-1234yf (and optionally R-32 and/or any other components of the composition such as a lubricant, a stabiliser or an additional flame retardant) can be added to the R-134a in the heat transfer device, thereby forming the compositions of the invention, and the heat transfer device of the invention, in situ. Some of the existing R-134a may be removed from the heat transfer device prior to adding the R-1234yf (and optionally R-32) to facilitate providing the components of the compositions of the invention in the desired proportions.

Thus, the invention provides a method for preparing a composition and/or heat transfer device of the invention comprising introducing R-1234yf, and optionally R-32, into a heat transfer device containing an existing heat transfer fluid which is R-134a. Optionally, at least some of the R-134a is removed from the heat transfer device before introducing the R-1234yf (and optionally R-32).

Of course, the compositions of the invention may also be prepared simply by mixing the R-134a, R-1234yf (and R-32 in the case of the ternary compositions) in the desired proportions. The compositions can then be added to a heat transfer device (or used in any other way as defined herein) that does not contain R-134a or any other existing heat transfer fluid, such as a device from which R-134a or any other existing heat transfer fluid have been removed.

In a further aspect of the invention, there is provided a method for reducing the environmental impact arising from operation of a product comprising an existing compound or composition, the method comprising replacing at least partially the existing compound or composition with a composition of the invention. Preferably, this method comprises the step of obtaining an allocation of greenhouse gas emission credit.

By environmental impact we include the generation and emission of greenhouse warming gases through operation of the product.

As mentioned above, this environmental impact can be considered as including not only those emissions of compounds or compositions having a significant environmental impact from leakage or other losses, but also including the emission of carbon dioxide arising from the energy consumed by the device over its working life. Such environmental impact may be quantified by the measure known as Total Equivalent Warming Impact (TEWI). This measure has been used in quantification of the environmental impact of certain stationary refrigeration and air conditioning equipment, including for example supermarket refrigeration systems (see, for example, http://en.wikipedia.org/wiki/Total_equivalent_warming_impact).

The environmental impact may further be considered as including the emissions of greenhouse gases arising from the synthesis and manufacture of the compounds or compositions. In this case the manufacturing emissions are added to the energy consumption and direct loss effects to yield the measure known as Life-Cycle Carbon Production (LCCP, see for example http://www.sae.org/events/aars/presentations/2007papasavva.pdf). The use of LCCP is common in assessing environmental impact of automotive air conditioning systems.

Emission credit(s) is/are awarded for reducing pollutant emissions that contribute to global warming and may, for example, be banked, traded or sold. They are conventionally expressed in the equivalent amount of carbon dioxide. Thus if the emission of 1 kg of R-407A is avoided then an emission credit of $1 \times 1990 = 1990$ kg $CO_2$ equivalent may be awarded.

In another embodiment of the invention, there is provided a method for generating greenhouse gas emission credit(s) comprising (i) replacing an existing compound or composition with a composition of the invention, wherein the composition of the invention has a lower GWP than the existing compound or composition; and (ii) obtaining greenhouse gas emission credit for said replacing step.

In a preferred embodiment, the use of the composition of the invention results in the equipment having a lower Total Equivalent Warming Impact, and/or a lower Life-Cycle Carbon Production than that which would be attained by use of the existing compound or composition.

These methods may be carried out on any suitable product, for example in the fields of air-conditioning, refrigeration (e.g. low and medium temperature refrigeration), heat transfer, blowing agents, aerosols or sprayable propellants, gaseous dielectrics, cryosurgery, veterinary procedures, dental procedures, fire extinguishing, flame suppression, solvents (e.g. carriers for flavourings and fragrances), cleaners, air horns, pellet guns, topical anesthetics, and expansion applications. Preferably, the field is air-conditioning or refrigeration.

Examples of suitable products include a heat transfer devices, blowing agents, foamable compositions, sprayable compositions, solvents and mechanical power generation devices. In a preferred embodiment, the product is a heat transfer device, such as a refrigeration device or an air-conditioning unit.

The existing compound or composition has an environmental impact as measured by GWP and/or TEWI and/or LCCP that is higher than the composition of the invention which replaces it. The existing compound or composition may comprise a fluorocarbon compound, such as a perfluoro-, hydrofluoro-, chlorofluoro- or hydrochlorofluoro-carbon compound or it may comprise a fluorinated olefin.

Preferably, the existing compound or composition is a heat transfer compound or composition such as a refrigerant. Examples of refrigerants that may be replaced include R-134a, R-152a, R-1234yf, R-410A, R-407A, R-407B, R-407C, R-507, R-22 and R-404A, particularly R-134a.

Any amount of the existing compound or composition may be replaced so as to reduce the environmental impact. This may depend on the environmental impact of the existing compound or composition being replaced and the environmental impact of the replacement composition of the invention. Preferably, the existing compound or composition in the product is fully replaced by the composition of the invention.

EXAMPLES

Flammability Testing

The ASHRAE Standard 34 methodology for flammability testing was employed in this test work. The method used is based on ASTM E681-04 "standard test method for concentration Limits of Flammability of Chemicals (vapours and gases)" Annex 1 "Test Method for Materials with Large Quenching Distances, which may be difficult to Ignite" (incorporated herein by reference). A video camera was used to record the tests and review of the record was carried out to establish a final determination of flammability. Spark ignition using 1 mm L shaped tungsten electrodes with a ¼-inch spark gap, powered by 30 mA at 15 KV was used. The spark duration was set via an electronic timer at between 0.2-0.4 seconds.

All tests were carried out in a 12 Liter short-necked round-bottomed flask. The stirring device was as described in E681. The atmospheric pressure was taken before each run and that pressure used to calculate the partial pressure of each component required to give the desired composition in the flask: since volume fraction and partial pressure are related by the gas law. Pressure measurement was by a calibrated 2 bar Druck pressure transducer capable of measuring accurately to 0.01 psi. The air humidity in the flask was regulated to be equivalent to 500 of saturation humidity at 23° C. The test temperature used was 60° C. for all tests.

Results from the flammability testing are shown graphically in FIGS. 1 to 7. The figures represent ternary compositions of fuel, diluent and air on a triangular composition plot, where the axes are scaled on volume fraction of each component. The curved (except for FIG. 2) lines plotted on the diagram represent the flammable region of compositions.

FIG. 1 shows the flammability behaviour of R-152a (fuel), R-134a (diluent) and air at 23° C. FIG. 2 shows the flammability behaviour of R-152a (fuel), R-1225ye(Z) (diluent) and air at 100° C. It can be deduced from the shape of the flammable region of R-152a with R-134a, in particular the downward curvature of the bottom, that R-134a is playing an active role in the flame chemistry and is not acting to suppress flammability. By contrast the shape of the flammable region in FIG. 2 shows that R-1225ye(Z) is acting to reduce the flammability of R-152a.

We have studied the flammability of R-1234yf in air at 23° C. and 60° C. using the ASHRAE Standard 34 flammability test protocol and found it to be quite sensitive to temperature.

The flammability of R-1234yf may be suppressed using inert carbon dioxide $CO_2$, as shown in FIGS. 3 and 4. At 23° C., mixtures of R-1234yf and $CO_2$ having at least 52% v/v $CO_2$ were found to be non-flammable. At 60° C. by contrast (as shown in FIG. 4), the minimum quantity of $CO_2$ required to render the mixture of R-1234yf/$CO_2$ non-flammable is 66% v/v. It may also be seen that the area of flammable region in the triangular map of fuel/air/diluent compositions has increased substantially from that at 23° C.

We also studied the effect of adding R-134a to R-1234yf. The results are shown in FIGS. 5 and 6. At 23° C. the R-1234yf can be rendered non-flammable if mixed with at least 30% v/v of R-134a. At 60° C. the R-1234yf can be rendered non flammable if mixed with at least 48% v/v R-134a. Furthermore, the size of flammable region is significantly reduced as compared to that observed with $CO_2$.

FIG. 6 illustrates the following data of interest for mixtures of R-1234yf/R-134a/air at 60° C.:

Lower flammable limit of R-1234yf in air: 6% v/v Upper flammable limit of R-1234yf in air: 15% v/v Minimum R-134a content for a non flammable R-1234yf/R-134a mixture: 45% v/v (42% w/w). This mixture has a GWP of 600.

In order for a mixed refrigerant to pass the ASHRAE flammability assessment as non flammable, a fractionation analysis must be undertaken and flammability assessed of both the worst case formulation that can be made in the manufacture of refrigerant and the worst case fractionated composition that can result from handling of this mixture. The test temperature for assessment of the worst case fractionated composition is 60° C. and that for assessment of the worst case formulation is 100° C. Further details are given in Appendix B of ASHRAE standard 34-2007, which is incorporated herein by reference.

The vapour-liquid equilibrium behaviour of R-1234yf with R-134a was studied by measurement of vapour pressure of a series of binary compositions in a static equilibrium cell apparatus. This consisted of a stirred sample cell of accurately known volume, held in a thermostatic bath, and charged with known amounts of R-1234yf and R-134a. The vapour pressure of mixtures of the fluids was determined over a range of temperatures and these data were then regressed to a suitable thermodynamic model using Barker's method as outlined in *The Properties of Gases and Liquids* $4^{th}$ edition (Reid, R C; Prausnitz, J M; Poling, B E pub. McGraw Hill 1986), which is incorporated by reference herein.

The system was found to form a minimum boiling azeotrope whose composition is approximately 15% v/v (13.7% w/w) R-134a at 1 atmosphere pressure, with an azeotropic normal boiling point of approximately −29.4° C. The data obtained in this experiment were fitted to a vapour liquid equilibrium model, and the ability of this model to reproduce the observed data was demonstrated by regression. The model was based on the Wilson equation to represent liquid phase fugacities and the Redlich Kwong equation of state to represent vapour phase fugacities. This thermodynamic model was then used to test the behaviour of R-1234yf/R-134a mixtures.

Mixtures containing higher proportions of R-134a than the azeotrope content at 1 atmosphere pressure were found to be nonazeotropic and to exhibit composition difference between vapour and liquid. If the liquid composition of R-134a is in the region of 40% v/v, the composition of the vapour phase is enriched in R-1234yf compared to the liquid phase. This means that the worst case fractionated composition for any assessment is the vapour in equilibrium with a specified liquid composition. This vapour composition must be at least 45% v/v R-134a in order to pass the nonflammability test at 60° C. ASHRAE Standard 34 Appendix B specifies that the composition should be determined at a temperature of 10 degrees Kelvin above the atmospheric bubble point of the mixture. This corresponds to a temperature of −19° C. for the 45% v/v R-134a mixture.

The liquid composition in equilibrium with a 45% v/v R-134a composition in the vapour phase is approximately 47% v/v, or 44% w/w at −19° C. It is anticipated therefore that compositions of at least 44% w/w R-134a will be required to ensure that the R-1234yf/R-134a binary mixture passes ASHRAE flammability assessment. The GWP of such a 44% R-134a mixture is 631, based on fourth assessment report (AR4) GWP values for R-1234yf and R-134a of 4 and 1430, respectively.

The experiment above illustrated in FIG. 6 with R1234yf as fuel was repeated at 60° C. for a binary fuel mixture of R-32 with R-1234yf in the volumetric proportions 12:88. The results are shown in FIG. 7. R-32 is also flammable: its lower and upper flammable limits in air are 14% and 30% respectively; its flame speed in air is approximately 7 cm/s; and its minimum ignition energy is between 30 and 100 milliJoules. It can be considered to be more flammable in some respects than R-1234yf, whose flame speed in air is less than 2 cm/s and whose minimum energy of ignition is more than 500 milliJoules.

In this case the key properties for the binary fuel mixture consisting of R-32/R-1234yf in the volumetric proportions 12:88 were found to be:
Lower flammable limit of fuel in air 7.5% v/v
Upper flammable limit of fuel 15% v/v
Minimum content of R-134a to be added to the fuel to give a non-flammable mixture: 34% v/v (33% w/w It is evident by comparing FIG. 7 with FIG. 6 that for the R-1234yf/R-32/R-134a ternary mixture: (i) the flammable region for this fuel when mixed with R-134a is smaller than the flammable region for the R-1234yf/R-134a binary mixture, (ii) the lower flammable limit in air is significantly higher than that of the R-1234yf/R-134a binary mixture, and (iii) the amount of R-134a required to create a non flammable mixture is lower than for the R-1234yf/R-134a binary mixture.

For a binary mixture of R-32 and R-1234yf in the proportions 12:88 on a volumetric (molar) basis, the minimum R-134a content to yield a non-flammable composition was found to be 34% v/v at 60° C. This corresponds to a ternary composition of 4% R32, 33% R-134a and 63% R-1234yf on a weight basis. Surprisingly, the amount of R-134a needed to be added to the mixture of R-32 and R-1234yf to render it non flammable (33% w/w) is considerably less than that needed for pure R-1234yf (42-44% w/w), even though on the basis of flame speed and ignition energy the R-32 component can be considered more flammable than R-1234yf.

The GWP of the ternary composition of 4% R32, 33% R-134a and 63% R-1234yf (w/w) using the AR4 data of 675 for R-32 and 1430 for R-134a is 501. A similar ternary composition of 4% R32, 34% R-134a and 62% R-1234yf (w/w) has a GWP of 516. Thus it is possible by adding R-32 to a R-1234yf/R-134a system to generate a nonflammable formulation having improved environmental impact (such as reduced GWP).

Air Conditioning Performance

The performance of selected compositions of the invention was evaluated in a theoretical model of a vapour compression cycle. The model used experimentally measured data for vapour pressure and vapour liquid equilibrium behaviour of mixtures, regressed to the Peng Robinson equation of state, together with correlations for ideal gas enthalpy of each component to calculate the relevant thermodynamic properties of the fluids. The model was implemented in the Matlab software package sold in the United Kingdom by The Mathworks Ltd. The ideal gas enthalpies of R-32 and R-134a were taken from public domain measured information, namely the NIST Fluid Properties Database as embodied in the software package REFPROP v8.0. The ideal gas heat capacity of R-1234yf was experimentally determined over a range of temperatures.

These calculations were performed following the standard approach as used in (for example) the INEOS Fluor "KleaCalc" software (other available models for predicting the performance of refrigeration and air conditioning systems known to the skilled person in the art may also be used), using the following conditions:

Mean evaporation temperature: 0° C.
Mean condensing temperature: 60° C.
Subcooling in condenser: 5K
Superheat in evaporator: 5K
Compressor isentropic efficiency: 670
Cooling Capacity: 6 kW
Suction line pipe diameter: 16.2 mm In the calculation it was assumed that the pressure drops in evaporator and condenser were negligible.

The results are shown in the following table, where the compositions are quoted on a weight basis.

|  | R32 | | | |
|---|---|---|---|---|
|  | 0% | 0% | 0% | 4% |
|  |  | R134a | | |
|  | 100% | 0% | 44% | 33% |
|  |  | R1234yf | | |
|  | 0% | 100% | 56% | 63% |
|  |  | GWP | | |
|  | 1430 | 4 | 631 | 501 |
| Pressure ratio | 5.79 | 5.24 | 5.40 | 5.37 |
| Volumetric efficiency | 83.4% | 84.5% | 84.2% | 84.5% |
| Condenser glide (K) | 0.0 | 0.0 | 0.0 | 1.4 |
| Evaporator glide (K) | 0.0 | 0.0 | 0.0 | 0.7 |
| Evaporator inlet temperature (° C.) | 0.0 | 0.0 | 0.0 | −0.4 |
| Condenser outlet temperature (° C.) | 55.0 | 55.0 | 55.0 | 54.3 |
| Condenser pressure (bar a) | 16.88 | 16.46 | 17.26 | 18.40 |
| Evaporator pressure (bar a) | 2.92 | 3.14 | 3.20 | 3.43 |
| refrigeration effect (kJ/kg) | 123.76 | 94.99 | 104.70 | 107.52 |
| Coefficient of Performance (COP) | 2.09 | 1.97 | 2.01 | 2.00 |
| Discharge temperature (° C.) | 97.46 | 91.37 | 93.76 | 96.69 |
| Mass flow rate (kg/hr) | 174.53 | 227.39 | 206.30 | 200.89 |
| Volumetric flow rate (m$^3$/hr) | 13.16 | 14.03 | 13.21 | 12.36 |
| Volumetric capacity (kJ/m$^3$) | 1641 | 1540 | 1635 | 1748 |
| Specific pressure drop (Pa/m) | 953 | 1239 | 1085 | 995 |
| COP relative to R-134a | 100.0% | 94.3% | 96.0% | 95.8% |
| Capacity relative to R-134a | 100.0% | 93.8% | 99.6% | 106.5% |
| Pressure drop relative to R-134a | 100.0% | 130.0% | 113.8% | 104.4% |

The non-flammable binary R-1234yf/R-134a offers improved performance relative to R-1234yf. If admixed into an existing system to replace refrigerant lost by leakage, performance will stay close to that of R-134a.

The non-flammable ternary R-32/R-1234yf/R-134a composition is the closest match to R-134a of these compositions and offers improved energy efficiency, reduced pressure drop and reduced GWP relative to the non flammable binary R-1234yf/R-134a mixture. This means that the overall environmental impact as assessed by LCCP analysis will be reduced by the addition of R-32 to the system.

Non-flammable compositions of R-1234yf/R-134a or R-32/R-1234yf/R-134a defined herein exhibit improved miscibility with standard PAG lubricants as compared to R-1234yf.

Furthermore their thermodynamic performance is improved relative to R-1234yf, and is sufficiently close to R-134a that they may be used in systems designed for R-134a with only slight loss in air conditioning performance. They may therefore be used in technology designed for R-134a with only slight system modifications in contrast to flammable R-1234yf.

The invention is defined by the following claims.

I claim:
1. A heat transfer composition comprising:
(i) from about 56 to about 57% by weight 2,3,3,3-tetrafluoropropene (R-1234yf); and
(ii) from about 43 to about 44% by weight 1,1,1,2-tetrafluoroethane (R-134a),
wherein the composition is non-flammable.

2. A heat transfer composition comprising:
   (i) from about 56 to about 57% by weight 2,3,3,3-tetrafluoropropene (R-1234yf); and
   (ii) from about 43 to about 44% by weight 1,1,1,2-tetrafluoroethane (R-134a),
wherein the composition has a volumetric refrigeration capacity within about 10% of an existing refrigerant that it is intended to replace.

3. A heat transfer composition comprising:
   (i) from about 56 to about 57% by weight 2,3,3,3-tetrafluoropropene (R-1234yf); and
   (ii) from about 43 to about 44% by weight 1,1,1,2-tetrafluoroethane (R-134a),
wherein the composition has a cycle efficiency (COP) within about 10% of an existing refrigerant that it is intended to replace.

4. A composition according to claim 1 consisting essentially of R-1234yf and R-134a.

5. A composition according to claim 2 consisting essentially of about 56% by weight R-1234yf and about 44% by weight R-134a.

6. A composition according to claim 2 consisting of R-1234yf and R-134a.

7. A composition according to claim 1 wherein the composition has a temperature glide is less than about 5 K.

8. A composition according to claim 2 wherein the existing refrigerant that it is intended to replace is R-134a and the composition has a volumetric refrigeration capacity within about 5% of the R-134a.

9. A composition according to claim 1 which is non-flammable according to ASHRAE Standard 34.

10. A composition according to claim 9 which is non-flammable at 60° C. according to ASHRAE Standard 34.

11. A composition according to claim 3 wherein the existing refrigerant that it is intended to replace is R-134a and the composition has a cycle efficiency within about 5% of the R-134a.

12. A composition according to claim 1 wherein the composition has a compressor discharge temperature within about 10 K of the existing refrigerant that it is intended to replace.

13. A composition according to claim 12 wherein the existing refrigerant that it is intended to replace is R-134a and the composition has a compressor discharge temperature within about 5% of the R-134a.

14. A composition comprising a lubricant and a composition according to claim 1 wherein the lubricant is selected from mineral oil, silicone oil, polyalkyl benzenes (PABs), polyol esters (POEs), polyalkylene glycols (PAGs), polyalkylene glycol esters (PAG esters), polyvinyl ethers (PVEs), poly(alpha-olefins) and combinations thereof.

15. A composition comprising a stabilizer and a composition according to claim 1.

16. A composition according to claim 15, wherein the stabiliser is selected from diene-based compounds, phosphates, phenol compounds and epoxides, and mixtures thereof.

17. A composition comprising a flame-retardant and a composition according to claim 1.

18. A composition according to claim 17 wherein the flame retardant is selected from the group consisting of tri-(2-chloroethyl)-phosphate, (chloropropyl) phosphate, tri-(2,3-dibromopropyl)-phosphate, tri-(1,3-dichloropropyl)-phosphate, diammonium phosphate, various halogenated aromatic compounds, antimony oxide, aluminium trihydrate, polyvinyl chloride, a fluorinated iodocarbon, a fluorinated bromocarbon, trifluoro iodomethane, perfluoroalkyl amines, bromofluoroalkyl amines and mixtures thereof.

19. A heat transfer device containing a composition as defined in claim 1.

20. A heat transfer device according to claim 19 which is a refrigeration device or an air-conditioning system.

21. A heat transfer device according to claim 20 which is selected from group consisting of automotive air conditioning systems, residential air conditioning systems, commercial air conditioning systems, residential refrigerator systems, residential freezer systems, commercial refrigerator systems, commercial freezer systems, chiller air conditioning systems, chiller refrigeration systems, and commercial or residential heat pump systems.

22. A heat transfer device according to claim 21 which contains a compressor.

23. A blowing agent comprising a composition as defined in claim 1.

24. A foamable composition comprising one or more components capable of forming a foam and a composition as defined in claim 1, wherein the one or more components capable of forming foam are selected from polyurethanes, thermoplastic polymers and resins, such as polystyrene, and epoxy resins, and mixtures thereof.

25. A foam comprising a composition as defined in claim 1.

26. A method for cooling an article which comprises condensing a composition defined in claim 1 and thereafter evaporating the composition in the vicinity of the article to be cooled.

27. A method for heating an article which comprises condensing a composition as defined in claim 1 in the vicinity of the article to be heated and thereafter evaporating the composition.

28. A mechanical power generation device containing a composition as defined in claim 1.

29. A mechanical power generating device according to claim 28 which is adapted to use a Rankine Cycle or modification thereof to generate work from heat.

30. A method of retrofitting a heat transfer device comprising the step of removing an existing heat transfer fluid, and introducing a composition as defined in claim 1.

31. A method of claim 30 wherein the heat transfer device is a refrigeration device or an air conditioning system.

32. A method for reducing the environmental impact arising from the operation of a product comprising an existing compound or composition, the method comprising replacing at least partially the existing compound or composition with a composition as defined in claim 1.

33. A method for preparing a composition as defined in claim 1 comprising introducing R-1234yf, and optionally a lubricant, a stabiliser and/or an additional flame retardant, into a heat transfer device containing an existing heat transfer fluid which is R-134a.

34. A method according to claim 33 comprising the step of removing at least some of the existing R-134a from the heat transfer device before introducing the R-1234yf, and optionally the lubricant, the stabiliser and/or the additional flame retardant.

35. A method for generating greenhouse gas emission credit comprising (i) replacing an existing compound or composition with a composition as defined in claim 1 wherein the composition as defined in claim 1 has a lower GWP than the existing compound or composition; and (ii) obtaining greenhouse gas emission credit for said replacing step.

36. A method of claim 35 wherein the use of the composition of the invention results in a lower Total Equivalent Warming Impact, and/or a lower Life-Cycle Carbon Production than is be attained by use of the existing compound or composition.

37. A method of claim 35 carried out on a product from the fields of air-conditioning, refrigeration, heat transfer, blowing agents, aerosols or sprayable propellants, gaseous dielectrics, cryosurgery, veterinary procedures, dental procedures, fire extinguishing, flame suppression, solvents, cleaners, air horns, pellet guns, topical anesthetics, and expansion applications.

38. A method according to claim 32 wherein the product is selected from a heat transfer device, a blowing agent, a foamable composition, a sprayable composition, a solvent or a mechanical power generation device.

39. A method according to claim 37 wherein the product is a heat transfer device.

40. A method according to claim 32 wherein the existing compound or composition is a heat transfer composition, and wherein the heat transfer composition is a refrigerant selected from R-134a, R-1234yf and R-152a, R-22, R-410A, R-407A, R-407B, R-407C, R-507 and R-404a, preferably R-134a.

* * * * *